Figure 1:
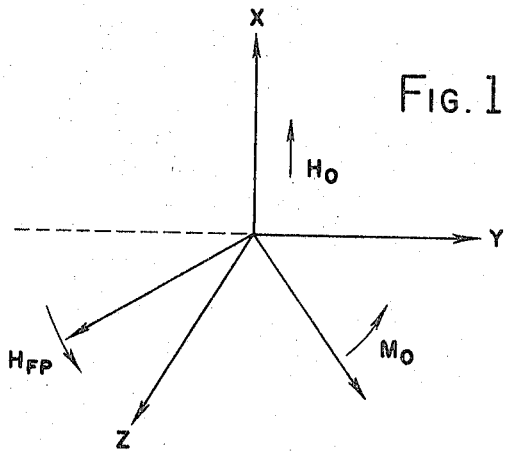

June 6, 1967    D. E. KAPLAN    3,324,461
SPIN ECHO MEMORY SYSTEM
Filed May 8, 1964

INVENTOR.
DANIEL E. KAPLAN
BY
George C Sullivan
Agent

United States Patent Office 3,324,461
Patented June 6, 1967

3,324,461
SPIN ECHO MEMORY SYSTEM
Daniel E. Kaplan, Los Altos, Calif., assignor to Lockheed Aircraft Corporation, Burbank, Calif.
Filed May 8, 1964, Ser. No. 365,921
5 Claims. (Cl. 340—173)

The present invention relates in general to improvements in spin echo memory systems and in particular to an improved means for achieving a microwave pulse delay or microwave pulse-script memory in electron systems at microwave frequencies.

The physical description of spin echo free precession phenomena is essentially the same for electrons as for nuclei. It has been developed by Hahn, Physical Review 80, 1950, and others familiar to those skilled in the art. The application of nuclear spin echo phenomena for information storage purposes has been studied and patented in U.S. Patent No. 2,714,714 by A. G. Anderson et al. in 1955.

The essential features of paramagnetic spin echo formation may be summarized as follows. A paramagnetic (electron) sample is contained in a microwave structure which provides a means for concentrating an electromagnetic field in the region of the sample. The electron spins of the sample are oriented either by means of a strong Zeeman magnetic field, or by the presence of internal crystalline electric fields, or both. The resultant magnetization of the sample $M_0$, due to the Boltzmann excess spin population in the lower energy state, is in equilibrium aligned along the polarizing axis of the internal or external field. The spin system can absorb energy from a radiation field at its Larmor frequency. The microwave structure containing the sample is oriented so that the magnetic component of the radiation field rotates in a plane transverse to the axis of polarization. Application of a microwave pulse of duration, $t_w$, at the Larmor frequency will tip the macroscopic magnetization from its normal orientation toward the transverse plane. A rotation of $\pi/2$ radians may be accomplished if the condition, $$\gamma_e H_1 t_w = \pi/2$$

obtains, where $\gamma_e$ is the effective electron gyromagnetic ratio and $H_1$ is the amplitude of the microwave magnetic field. The pulse duration is assumed to be short relative to the electron thermal and phase memory relaxation times, $T_1$ and $T_2$, respectively. Following cessation of the microwave pulse, the macroscopic magnetization precesses about the axis of polarization inducing a rotating magnetic field, $H_{fp}$, in the microwave structure. This field lags the precessing magnetization by $\pi/2$ radians. The precessing magnetization and its resultant radiation field diminish in amplitude with time due to angular dephasing of the component spins contributing to $M_0$. This dephasing proceeds because of a distribution in precessional frequencies over the sample associated with the resonant linewidth, $\Delta\omega$. There is hence a free precession signal following the pulse of duration $t_e \sim 1/\Delta\omega$. The spins, however, preserve their relative phases for a time $T_2$ (phase memory time) which is usually much greater than $t_e$. $T_2$ is roughly a measure of the time required for spins to scramble their relative spectral positions due to dynamical electron-electron and electron-nuclear spin-spin interactions. A second pulse of amplitude sufficient to rotate the entire spin ensemble by $\pi$ radians, applied to a time, $\tau$, following the first pulse will give rise to constructive interference of the dephased spins provided $\tau$ lies in the interval $t_e < \tau < T_2$. This pulse may be regarded as flipping over the "pancake" of spins which exists in the transverse plane at a time $t > t_e$. The resultant signal from the $\pi/2-\pi$ pulse sequence, separated by a time $\tau$, will occur at a time $2\tau$ following the first pulse. This signal is popularly termed a "spin echo." It may be regarded quite properly as the first pulse delayed or stored for a chosen time interval and recalled on command by the second pulse.

The essential element in any microwave spin echo system is a paramagnetic material contained in some type of microwave structure. This structure is coupled to a microwave transmission line by suitable means and a means provided for separation of input and output signals. The structure itself provides a means of coupling, in an electromagnetic sense, microwave driving signals in the transmission line to the spin magnetism of the sample, and conversely, of transferring energy from coherent processing sample magnetization to the radiation field, this energy being associated with spin echo phenomena occurring in the sample.

Several factors enter in assessing the utility of a given microwave structure:

The "efficiency" of a structure may be discussed in terms of the input pulse power required to produce a given spin tipping angle and concomitantly of the signal power generated in the structure by precessing spin magnetization of a paramagnetic sample with a given spin density.

The "frequency bandwidth" of a structure determines its ability to encompass the spectral bandwidth of a given paramagnetic system. For resonant structures, the bandwidth is associated with the quality factor, Q, of the structure, and determines as well the signal intensity properties and power requirement. The bandwidth limits as well the minimum pulse duration that may be sustained in the structure due to the Fourier relationship between spectral width and pulse time duration, $\Delta\omega \sim 1/t_w$. A low Q value is in fact necessary to sustain short duration pulses, but a low Q also necessitates high driving power and reduces the spin echo signal amplitude. The bandwidth also limits the range of operating frequencies that may be realized without having to re-tune the resonant frequency of the structure.

The "filling factor" of the structure relates to the actual volume of the structure utilized to contain the paramagnetic sample. This is in essence determined by that volume within the structure containing a region of maximum and uniform microwave magnetic field, $H_1$. A structure that provides a high filling factor $$\left(\frac{\text{sample volume}}{\text{structure volume}}\right)$$

permits efficient utilization of space.

Historically, all proposals for spin echo systems, both nuclear (radio frequencies) and electron (microwave frequencies) have utilized resonant sample structures as a means of providing an enhanced radiation field density in the region of the sample. In the case of electron spin systems, the large spectral bandwidth often found, $\Delta F \gtrsim 0.01 f_0$, where $f_0$ is the resonant frequency, and the necessity to include the entire physical bandwidth of the paramagnetic system within the bandwidth of the microwave structure requires the use of low Q resonant structure, e.g., $Q \sim 100$. The term non-resonant microwave structure as hereafter used is directed to those microwave devices having a resonant frequency to bandwidth ratio of approximate unity, e.g., $Q \sim 1$.

It is the object of the present invention to provide an electron spin echo memory system using a non-resonant traveling wave structure.

Another object of the present invention is to utilize the electron spin echo technique in the absence of an external DC magnetic field either for purposes of polarizing the sample spins or inhomogeneously broadening their spectral response.

One feature of the present invention is to provide an electron spin echo memory system requiring substantially less driving power than previous systems.

Another feature of the present invention is to provide an electron spin echo memory system which produces an improved signal power from a given number of spins.

Another feature of the present invention is to provide an electron spin echo memory system having an improved filling factor and improved bandwidth over previous systems.

Figure 2:
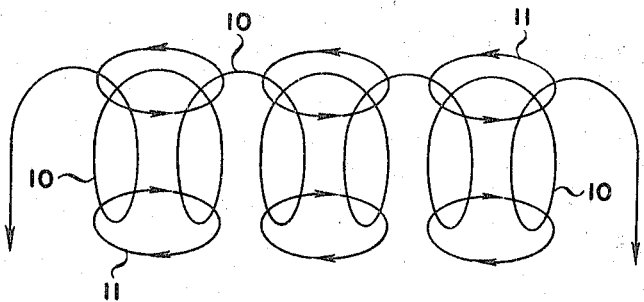
Figure 3:
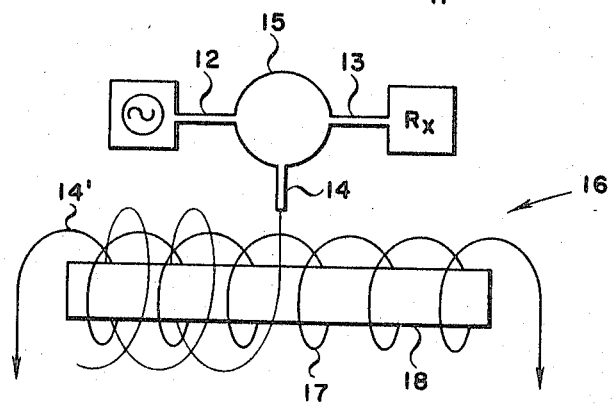
Figure 4:
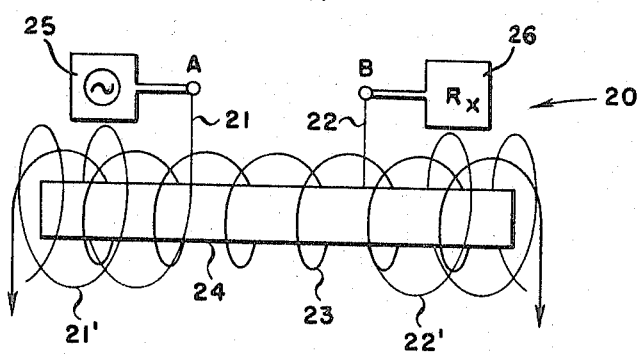

These and other objects, features, and advantages of the present invention will become apparent after a perusal of the specification taken in connection with the accompanying drawings wherein:

FIGURE 1 is a schematic drawing illustrating a microwave field lagging in phase by $\pi/2$ radians the precessing moment, FIGURE 2 is a schematic drawing illustrating a helix structure and its associated magnetic field lines, FIGURE 3 is a schematic drawing illustrating one microwave system useful for spin echo memory applications, and FIGURE 4 is a schematic drawing illustrating an alternative microwave system useful for spin echo memory applications.

We will now consider the properties of a typical traveling wave structure, the helix, used for spin echo purposes at microwave frequencies, and describe and illustrative means for coupling the helix in a broadband manner to a microwave system which exploits the superior features of a helix for spin echo purposes. While the calculations which will be set down apply specifically to a helix, it is understood that these considerations are quite generally applicable to other types of traveling wave structures by those skilled in the art.

We proceed to calculate and compare the properties of a resonant (cavity) structure and the properties of a helix structure as they pertain to microwave electron spin echo phenomena. For purposes of calculation it is convenient to assume that the paramagnetic sample is polarized in an external magnetic field, $H_0$. The results are quite generally valid for spin echo phenomena obtained with polarizing fields resulting from sources internal to the sample. We assume a paramagnetic sample of specific magnetization, M, where M is given by:

(1) $$M = \frac{\gamma_e^2 \hbar N_0}{4KT}$$

where:

$\gamma$ = gyromagnetic ratio of electron
$\hbar$ = Planck's constant
$N$ = number of ions/cm.$^3$
$H_0$ = magnetic field in gauss
$K$ = Boltzmann constant
$T$ = absolute temperature We calculate the signal strength due to the precessing magnetization, M, due to the existence of a coherent magnetic moment comprising the spin echo. As illustrated in FIGURE 1, this magnetization will give rise to a microwave magnetic field, $H_{fp}$, lagging in phase by $\pi/2$ radians in the transverse plane, defined by axis Y–Z, the precessing moment, $M_0$. The spin echo signal power is associated with the radiation field. We may write the torque equation for this moment as:

(2) $$\left(\frac{dM}{dt}\right)_{fp} = \gamma_e H_{fp} \times M$$

where $(dM/dt)_{fp}$ represents the time rate of change of M due to the effect of $H_{fp}$ only. The change in the magnetic energy of the system due to this effect is given by:

(3) $$\frac{d}{dt}(A_0 \cdot M)_{fp} = H_0 \left(\frac{dM}{dt}\right)_{fp} = \gamma_e H_0 H_{fp} M$$

$H_{fp}$ is related to M by a constant of proportionality K which depends on the properties of the microwave structure. We write:

(4) $$H_{fp} = KM$$

and then:

(5) $$\frac{d}{dt}(H_0 \cdot M)_{fp} = \omega_0 K M^2$$

where K remains to be determined. This is the power radiation per unit volume of sample due to the spin echo. The total power radiated for a sample of volume, $V_s$, is then:

(6) $$P_r = \omega_0 K M^2 V_s$$

We now evaluate K for a cavity and for a helix. The relationship between the radiation field component $H_1$ and the power in a cavity of volume $V_c$ is:

(7) $$P_r = \omega_0 V_c \frac{(2H_1)^2}{8\pi Q}$$

Equating (6) and (7) we find, using Equation 4 with $H_1 = H_{fp}$, (8) $$K_c = 2\pi Q V_s / V_c$$

then for a cavity:

(9) $$(P_2)_c = \frac{\omega_0 2\pi Q}{V_c}(\overline{M})^2$$

where $\overline{M} = M V_s$ (total magnetic moment of sample).

For a helix or diameter $2a$ and pitch $n$ the relationship between $P_r$ and $H_1$ is:

(10) $$P_r = \frac{375}{\pi_n} a H_1^2$$

Using the same procedure as for the cavity, we obtain the helix expressions for K and $P_r$ (M) as:

(11) $$K_h = \frac{\omega_0 V_s \pi n}{375 a}$$

(12) $$(P_r)_h = \frac{\omega_0 2 \pi n}{375 a}(\overline{M})^2$$

For numerical evaluation we choose a cavity optimized by reducing its height to provide an enhanced radiation field for spin echo purposes. This reduction in height may be expressed by choosing $V_c$, the cavity volume, to be a minimum. We choose a helix as illustrated in FIGURE 2, where helix 10, having a pitch, $n$, and diameter, $2a$, optimized to provide a uniform and dominant axial mode for the electromagnetic field 11 over the helix volume. This condition may be expressed by subjecting the pitch and diameter, taken with the free space wavelength, $\lambda_0$, to the following constraint:

(13) $$1 \leq \frac{4\pi^2 n a^2}{\lambda_0} \leq 1.5$$

A numerical comparison of the helix and resonant cavity parameters at microwave X-band ($\lambda_0 = 0.33$ cm., $f_0 = 9.3$ gc.) pertains directly to our experimental results. Similar results, however, can be shown at other microwave frequencies; the conclusions of the comparison have broad applicability.

At center X-band, an optimized cavity for spin echo purposes may reasonably be characterized by a volume $V_c = 1$ cm.$^3$ and a Q value not exceeding 100. An optimum helix will be characterized by a radius $a$ of 0.1 cm., and a pitch of $n = 12$ turns/cm.

On comparing Equations 9 and 12 we find that for a given value of $H_1$ the ratio of the power required to drive a cavity to that required to drive the helix is:

(14) $$\frac{(P_r)_c}{(P_r)_H} = \frac{W_0 V_c \frac{1}{2\pi Q}}{\frac{375}{\pi n} a 10^7}$$

Substituting the appropriate numerical values, one finds that: $(P_r)_c/(P_r)_H \sim 10$; i.e., approximately 10 times less power is required to drive the helix to obtain the same pulse angel.

On comparing Equations 9 and 12 we find that for a given value of sample magnetization, the ratio of the power generated by the precessing spins in the helix to that in the cavity is also given by Equation 14. Hence, 10 times more power will be delivered by the helix in this case.

The filling factor for a resonant cavity, even when optimized, cannot reasonably exceed 0.1 for spin echo applications because of the restricted regions of uniform and intense microwave magnetic field. The absolute sample size used in a cavity is itself restricted by the specific dimensions necessary for a cavity resonant at a certain frequency. On the other hand, the filling factor of the optimized helix is 1.0 as long as the condition given by Equation 13 is maintained. The helix is further unrestricted as to length and hence is unrestricted as to volume. Equal size samples may then be reasonably contained in either type of structure; the helix will typically require 10 times less physical space to contain an equivalent amount of paramagnetic material.

The frequency bandwidth of the resonant cavity (or any resonant structure) is determined by the Q and will in this case be on the order of one percent:

$$\frac{\Delta f}{f_0} \sim \frac{1}{Q} = 1\%$$

Greater bandwidths may be obtained only at the expense of lowering the Q which will further degrade the electrical characteristics of the cavity. The frequency bandwidth of the helix is limited only by the necessity to maintain a uniform axial mode, again Equation 13. A fifty percent variation in the operating frequency, $$f_0 = \frac{c}{\lambda_0}$$

is possible while maintaining this condition. Hence, the helix has approximately 50 times greater bandwidth than a cavity with a Q of 100.

As has been pointed out above, it is necessary to provide a means for coupling any microwave structure utilized for spin echo purposes to a microwave transmission line and to provide a means of separation of input and output signals. Such techniques are presently available and well known in the general microwave art. FIGURES 3 and 4 schematically illustrate two systems which are suitable and useful for spin echo applications and which can provide coupling bandwidths of the same order as the effective bandwidth of the helix. Both systems employ the synchronous helix coupler, now widely utilized in traveling wave tubes.

The system of FIGURE 3 provides a microwave input 12, for example, a wave guide coupled to the input of a cyclic microwave device 15, for example, a circulator, from a source of microwave input power at a frequency of 9.4 gc., for example. A first output of circulator 15 is connected to a memory element 16 by microwave channel 14, for example, a wave guide. Memory element 16 comprises a sample bar 18 of a paramagnetic material, for example, calcium fluoride in monocrystalline and polycrystalline form and doped with trivalent cerium. Surrounding sample bar 18 is sample helix 17, wound the length of sample bar 18. Concentric with sample helix 17, but wound in the opposite sense, is a coupling helix 19 connected to microwave channel 14 by any suitable coupling means. The spin echo launches a signal back up channel 14 into circulator 15 and out an output channel 13 to a suitable receiver.

FIGURE 4 depicts a memory element 20 comprising sample bar 24 surrounded by sample helix 23. In this embodiment, an input signal from a suitable microwave power source 25 is coupled from input A via microwave channel 21 to input helix 21'. This input signal launches a wave on the sample helix 23, and exits a spin echo response from the sample 24. The precessing magnetization associated with the spin echo itself launches waves traveling both directions on sample helix 23. The wave traveling left will couple a signal via channel 22 from output helix 22' to an output B which could be any suitable receiver 26.

What we have shown, described and pointed out are the fundamental features of a spin echo memory device which uses a non-resonant traveling wave structure. It will be understood that changes in form and details may be made by those skilled in the art without departing from the spirit of the invention as set forth and defined in the following claims.

What is claimed is:

1. An electron spin echo memory system comprising a microwave structure having a quality factor of approximately 1 electromagnetically coupled to a paramagnetic sample for concentrating an electromagnetic field in the region of said paramagnetic sample, a microwave transmission line electromagnetically coupled to said structure for feeding a microwave signal to said structure and means for retrieving a spin echo signal from said paramagnetic sample.

2. The electron spin echo memory system according to claim 1 wherein said microwave structure includes a traveling wave helix surrounding said paramagnetic sample.

3. The electron spin echo memory system according to claim 2 wherein said microwave transmission line and said means for retrieving a spin echo signal from said paramagnetic sample is a single wave guide electrically connected to a coil surrounding said traveling wave helix.

4. An electron spin echo memory system comprising a traveling wave helical device surrounding a paramagnetic sample, a coupling coil surrounding said traveling wave helical device and concentric therewith, a microwave transmission line connected on one end to said coupling coil and on the other end to a cyclic microwave device, an input microwave transmission line connected to an input of said cyclic microwave device at a first end thereof and connected to a source of input power at a second end thereof, and an output microwave transmission line connected to the second end of said cyclic microwave device and a receiver connected to said microwave transmission line.

5. An electron spin echo memory system comprising a traveling wave helical device surrounding a paramagnetic sample, first and second coupling coils surrounding said traveling wave helical device, an input microwave transmission line connected on one end to said first coupling coil and on the other end to a power source, an output microwave transmission line connected on one end to said second coupling coil and on the other end to a receiver.

References Cited

UNITED STATES PATENTS 3,014,210  12/1961  Beaumont _____ 340—173

BERNARD KONICK, *Primary Examiner.*

J. BREIMAYER, *Assistant Examiner.*